United States Patent [19]
Bates et al.
[11] 3,728,476
[45] Apr. 17, 1973

[54] LUMINANCE NOTCH FILTER

[75] Inventors: William C. Bates, Clay; Thomas T. True, Camillus, both of N.Y.
[73] Assignee: General Electric Company

[22] Filed: Mar. 17, 1971
[21] Appl. No.: 125,275

[52] U.S. Cl. .........................178/5.4, 333/70, 333/76
[51] Int. Cl. ............................H03h 7/04, H04n 5/14
[58] Field of Search......................333/70, 76, 78, 17, 333/29; 331/36; 178/5.2, 5.4

[56] References Cited

UNITED STATES PATENTS

| | | | |
|---|---|---|---|
| 3,336,438 | 8/1967 | Marks | 178/5.4 |
| 3,265,810 | 8/1966 | Falk | 178/5.4 |
| 3,585,280 | 6/1971 | McMann | 178/5.4 |
| 3,562,410 | 2/1971 | Lovely | 178/5.4 |
| 3,597,529 | 8/1971 | Hickman | 178/5.4 |
| 3,586,762 | 6/1971 | Hodge | 178/5.4 |
| 2,914,666 | 11/1959 | Derovet | 178/5.4 |

*Primary Examiner*—Herman Karl Saalbach
*Assistant Examiner*—Marvin Nussbaum
*Attorney*—Frank L. Neuhauser, Oscar B. Waddell, Joseph B. Forman, Michael Masnik and James J. Williams

[57] ABSTRACT

Chrominance frequency components in the luminance channel of a color television camera are reduced by a luminance channel notch filter having substantially linear phase characteristics and adjustable notch depth. The luminance notch is developed by subtraction of a bandpass-filtered video signal from the overall video input signal. The filter, which exhibits symmetrical transient response, improved low light level noise performance and minimizes spurious color effects due to interaction of chrominance signal components with the luminance signal.

7 Claims, 3 Drawing Figures

INVENTORS:
WILLIAM C. BATES,
THOMAS T. TRUE,
BY Marvin Snyder
THEIR ATTORNEY.

LUMINANCE NOTCH FILTER

This invention relates to electrical filters, and more particularly to a notch filter for extracting chrominance frequency components from the luminance frequency band of a color television signal.

Chrominance frequency components that fall inside the luminance band in a television encoder, wherein signals produced by television cameras are used to generate a composite color signal for broadcasting in accordance with applicable government standards, result in spurious color and increased low frequency noise in the video signal due to the chroma detection process that occurs in color television reproducing apparatus. By removing the chrominance frequency components from the luminance band, these deleterious effects may be substantially eliminated. The chrominance frequency components may be removed from the luminance band with a notch filter in the manner described herein.

The luminance notch filter of the present invention acts to subtract a bandpass-filtered video signal from the overall video signal. Employment of a bandpass filter with essentially linear phase characteristics in the vicinity of its center-tuned frequency results in a notch filter having symmetrical transient response and minimum spurious ringing, and exhibiting substantially linear phase characteristics so that the spurious responses and noise are reduced with but minimal degradation in the luminance picture as viewed on a color video image monitor.

Accordingly, one object of the invention is to provide a filter for use in removing chrominance frequency components from the luminance frequency band of a color television signal.

Another object is to provide a symmetrical notch filter having capability of high rejection ratio in the notch along with minimal phase distortion in the passband.

Another object is to provide an active notch filter having a continuously variable notch depth.

Briefly, in accordance with a preferred embodiment of the invention, a notch filter for extracting chrominance frequency components from the luminance frequency band of a color television signal comprises a delay line and a bandpass filter, each receiving the color television signal. Means are provided for coupling the output of the delay line to a first input of a differential amplifier and additional means are provided for coupling the output of the bandpass filter to a second input of the differential amplifier. The differential amplifier subtracts the signal received at its second input from the signal received at its first input so as to minimize presence in the overall color television luminance signal of any signal components within the frequency band passed by the bandpass filter.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
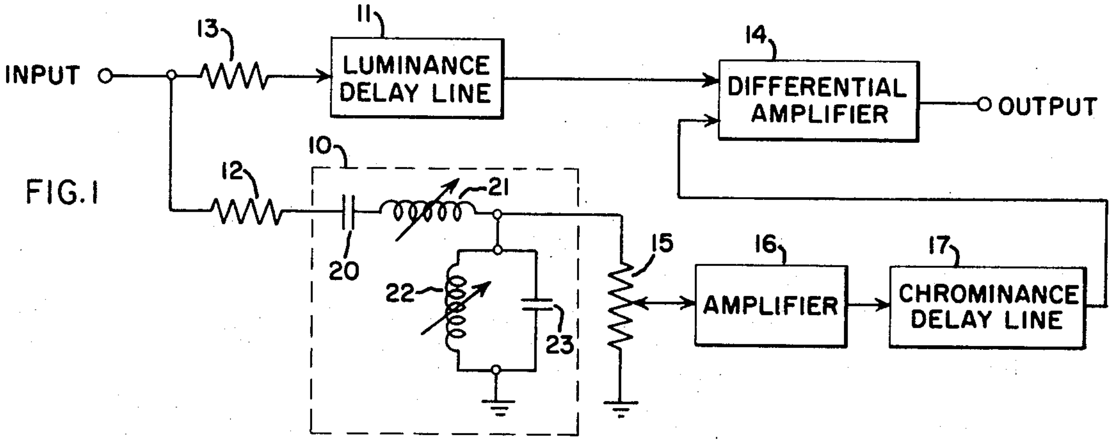
FIG. 1 is a block diagram of the filter of the instant invention.

FIG. 1 illustrates the luminance notch filter of the invention as it is normally employed in the encoder of a color television transmitter. The wide band input signal, comprising the overall color video signal subsequently to be amplitude-modulated on a carrier for broadcast, is supplied to a chrominance bandpass filter 10 and a luminance delay line 11 through a pair of coupling resistances 12 and 13, respectively. Delay line 11 exhibits a substantially linear change in phase with respect to frequency. The characteristic impedances of bandpass filter 10 and delay line 11 are selected to be equal to each other, and the ohmic value of each of resistances 12 and 13 is likewise selected to be equal to the characteristic impedance of each of filter 10 and delay line 11, respectively. Bandpass filter 10 has a bandwidth of approximately 500 KHz and is center-tuned at the chrominance subcarrier frequency of 3.58 MHz.

Output signals from delay line 11 are furnished to a first input of a differential amplifier 14. Output signals from bandpass filter 10 are supplied across a variable potentiometer 15. The signal at the tap of potentiometer 15 is furnished through an impedance-matching amplifier 16 to the input of a chrominance delay line 17. Delay line 17 exhibits a substantially linear change in phase with respect to frequency. Output signals from delay line 17 are furnished to a second input of differential amplifier 14. Differential amplifier 14 subtracts the signals furnished to its second input from the signals furnished to its first input.

Figures 2A, 2B:
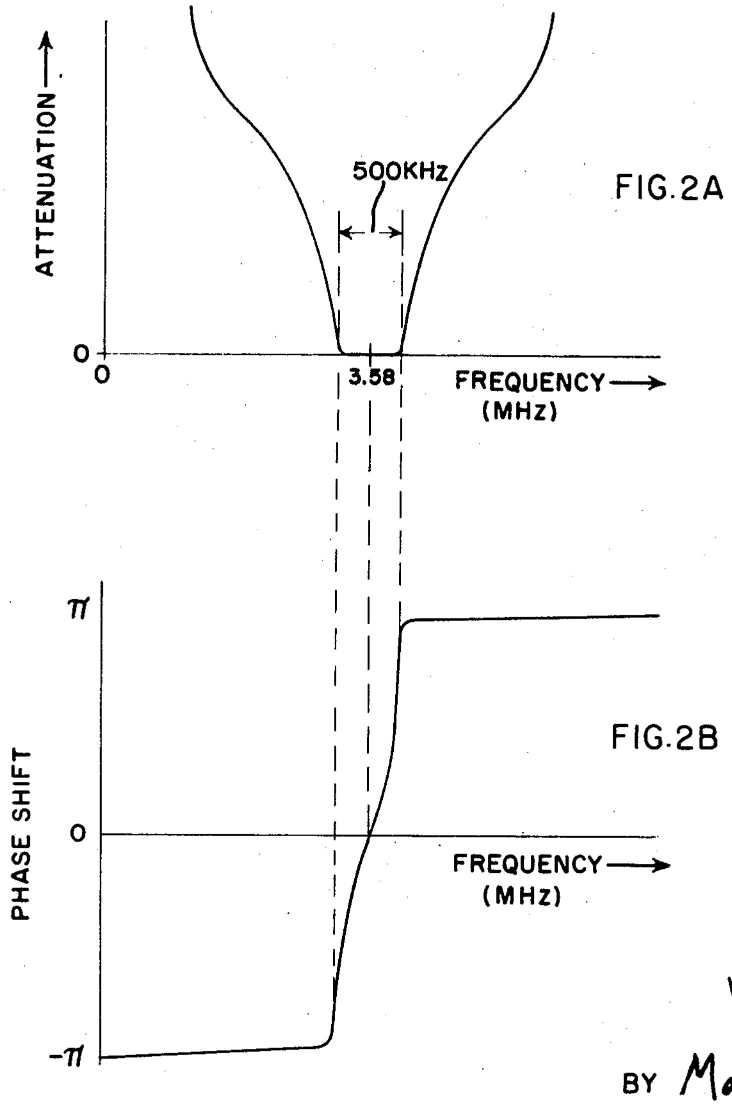
FIGS. 2A and 2B are curves used to aid in the description of the invention.

Bandpass filter 10, which is of constant-*k* design, employs a capacitance 20 and an inductance 21 in series with resistance 12, and an inductance 22 and capacitance 23 in shunt with each other between inductance 21 and ground so as to be in shunt with potentiometer 15. Component selection formulas for the constant-*k* design of filter 10 are set forth in detail on pp. 170–171 of Reference Data for Radio Engineers, 4th Edition, published by International Telephone and Telegraph Corporation, N.Y. 1957. Inductances 21 and 22 are preferably variable, so as to permit fine adjustment of filter 10. The component values employed in bandpass filter 10 result in the filter characteristics shown in FIGS. 2A and 2B, which are illustrated on a common frequency scale. With a bandwidth of approximately 500 KHz centered about a frequency of 3.58 MHz, attenuation introduced by filter 10 is substantially zero, as evident in FIG. 2A. Moreover, within this same 500 KHz bandwidth, as evident in FIG. 2B, the change in phase with frequency caused by presence of filter 10 is approximately linear and, at the center-tuned frequency of 3.58 MHz, the phase shift introduced by filter 10 is substantially zero.

In operation, the circuit of FIG. 1 receives color video signals at its input. These signals are furnished, with a phase delay introduced by delay line 11, to the first input of differential amplifier 14. These signals are also furnished to the input of bandpass filter 10 which, because it exhibits the attenuation characteristic illustrated in FIG. 2A, attenuates substantially all except the chrominance components present in the signal, and applies the resulting signal across potentiometer 15.

Overall attenuation of the signal passed through filter 10 is determined by the setting of the variable tap on potentiometer 15; that is, a high setting of the potentiometer tap permits a large amplitude of the chrominance components which lie within the 500 KHz bandwidth centered about 3.58 MHz to reach amplifier 14 while, conversely, a low setting of the potentiometer reduces amplitude of the chrominance components reaching amplifier 14.

Delay line 17 is selected so that any frequency of signal received from amplifier 16 is phase-delayed by an amount equal to the difference between the phase delay introduced by delay line 11 at that frequency and the phase delay experienced in filter 10 at that frequency. Since the phase delay introduced by delay line 11 exceeds the phase delay experienced in filter 10, delay line 17, which is preferably adjustable, serves to assure that the signals supplied to the first and second inputs of differential amplifier 14 are supplied in an in-phase condition.

Due to the linear, symmetrical phase characteristics of filter 10, any deviation from the center frequency within the 500 KHz bandwidth centered about the 3.58 MHz subcarrier frequency produces substantially equal and opposite phase shifts for equal frequency deviations above and below the 3.58 MHz frequency, respectively. The net effect is to provide a signal to the input of chrominance delay line 17 which is shifted in phase in a substantially linear fashion with frequency over the frequency range of approximately 3.58 ± 0.25 MHz, while frequencies outside this range are severely attenuated. Delay line 17 furnishes to the signal produced by filter 10 an additional, substantially linear change in phase with respect to frequency, while delay line 11 imparts a substantially linear change in phase with respect to frequency of the overall video signal which it receives. As a result, the signals appearing at the first and second inputs to differential amplifier 14 are essentially in phase over the entire frequency range of approximately 3.58 ± 0.25 MHz, permitting the differential amplifier to subtract the signal at its second input from the signal at its first input to provide an output signal comprising the overall video signal with reduced, or substantially eliminated, signal components within the frequency range of approximately 3.58 ± 0.25 MHz. The effect of this reduction of signal components within a specified bandwidth is that of a notch filter; that is, the amplitude response curve for the filter exhibits a notch, or attenuated response, over a specified frequency range. In this case, the frequency range is approximately 3.58 ± 0.25 MHz. Because of the substantially linear phase characteristics of delay lines 11 and 17, and the approximately linear phase characteristics of filter 10 within the bandpass region, the resulting notch filter similarly exhibits substantially linear phase characteristics. As a result, spurious frequency products and ringing are held to a minimum.

By varying the setting of the tap on potentiometer 15, the amplitude of signal produced by bandpass filter 10 is varied. Because of the attenuation that bandpass filter 10 introduces into all but approximately a 500 KHz bandwidth centered about the frequency of 3.58 MHz, variation of the setting of the tap on potentiometer 15 has the greatest absolute effect on signal components within that bandwidth. Hence, variation of the tap setting results mainly in a variation of notch depth in the notch filter amplitude response curve. By setting the tap on potentiometer 15 at an appropriate level, unity gain of the luminance signal together with a maximum notch depth in excess of 20 decibels may be achieved. Moreover, the notch filter is substantially symmetrical in that it exhibits a symmetrical phase response as a consequence of the symmetrical phase response of the bandpass filter. This symmetrical phase response results in improved transient response for the notch filter since preshoots and overshoots of the signal are thereby symmetrical.

By way of illustration, but not to be construed in a limiting sense, the following specific component values have been found to yield particularly desirable operation when employed with bandpass filter 10 in the invention:

| | |
|---|---|
| Capacitance 20 | 15 picofarads |
| Inductance 21 | 106 microhenries (nominal) |
| Inductance 22 | 3.3 microhenries (nominal) |
| Capacitance 23 | 560 picofarads |
| Resistance 12 | 500 ohms |
| Potentiometer 15 | 500 ohms |
| Delay line 11 | 700 nanoseconds |
| Delay line 17 | 140 nanoseconds plus 0 to 40 nanoseconds trim. |

The foregoing describes an active notch filter for use in removing chrominance frequency components from the luminance frequency band of a color television signal. The notch filter has capability of high rejection ratio in the notch along with minimal phase distortion in the passband. Notch depth of the filter is continuously variable.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

We claim:

1. A substantially symmetrical notch filter for rejecting a relatively narrow band of frequencies from a wide band luminance signal wherein said narrow band of frequencies has a width corresponding substantially to the band width of a chrominance signal, comprising:

a delay line producing substantially linear changes in phase with frequency;

a bandpass filter producing substantially linear changes in phase with frequency over said narrow band of frequencies corresponding substantially to the band width of a chrominance signal, said bandpass filter further producing substantially equal and opposite phase shifts for equal frequency deviations above and below a center-tuned frequency;

means for coupling said wide band luminance signal to the input of each of said delay line and bandpass filter; and circuit means coupled to the output of said delay line and said bandpass filter for subtracting the relatively narrow band of frequencies passed by said bandpass filter from the signal passed by said delay line.

2. The notch filter of claim 1 wherein said circuit means comprises:

a differential amplifier having first and second inputs;

means coupling the output of said delay line to said first input of said differential amplifier so as to produce a signal of predetermined phase angle for any given frequency, respectively, at said first input of said differential amplifier; and means coupling the output of said bandpass filter to the second input of said differential amplifier so as to produce a signal substantially of said predetermined phase angle for said given frequency, respectively, at said second input of said differential amplifier, said differential amplifier producing an output signal having reduced amplitude at the passband frequencies of said bandpass filter.

3. The notch filter of claim 1 including variable attenuating means coupling the output of said bandpass filter to said circuit means.

4. The notch filter of claim 2 wherein said means coupling the output of said bandpass filter to the second input of said differential amplifier comprises variable attenuating means.

5. The notch filter of claim 1 including an additional delay line coupling the output of said bandpass filter to said circuit means.

6. The notch filter of claim 2 wherein said means coupling the output of said bandpass filter to the second input of said differential amplifier comprises an additional delay line.

7. The notch filter of claim 2 wherein said means coupling the output of said bandpass filter to the second input of said differential amplifier comprises an additional delay line coupled to said second input of said differential amplifier, and variable attenuating means coupling the output of said bandpass filter to the input of said additional delay line.

* * * * *